US005511812A

United States Patent [19]

Milner

[11] Patent Number: 5,511,812

[45] Date of Patent: Apr. 30, 1996

[54] FIFTH WHEEL COUPLING

[75] Inventor: Peter J. Milner, West Midlands, England

[73] Assignee: Bloxwich Engineering Limited, England

[21] Appl. No.: 318,785

[22] Filed: Oct. 4, 1994

[30] Foreign Application Priority Data

Apr. 29, 1992 [GB] United Kingdom .................... 9209259

[51] Int. Cl.$^{6}$ ...................................................... B62D 53/08

[52] U.S. Cl. .................. 280/433; 73/862.57; 73/862.637

[58] Field of Search ................................ 280/433, 438.1, 280/441.1, 441, 432, 439; 73/862.57, 862.042, 862.637, 862.632

[56] References Cited

U.S. PATENT DOCUMENTS

| | | | |
|---|---|---|---|
| 4,666,003 | 5/1987 | Reichow | 73/862.632 X |
| 5,029,947 | 7/1991 | Knight et al. | 280/432 |
| 5,438,881 | 8/1995 | Schedrat et al. | 280/504 X |

FOREIGN PATENT DOCUMENTS

| | | |
|---|---|---|
| 0154728 | 9/1985 | European Pat. Off. . |
| 0386939 | 9/1990 | European Pat. Off. . |
| 1601377 | 10/1981 | United Kingdom . |
| WO91/11351 | 8/1991 | WIPO . |

*Primary Examiner*—Kevin T. Hurley
*Attorney, Agent, or Firm*—Baker, Maxham, Jester & Meador

[57] ABSTRACT

A vertical and longitudinal force sensor for use in a fifth wheel hitch. The sensor comprises a beam and transducers for measuring the horizontal and vertical deflections at true center of the beam. The beam comprises two outer parts and an inner part which serves to actuate the transducers.

20 Claims, 4 Drawing Sheets

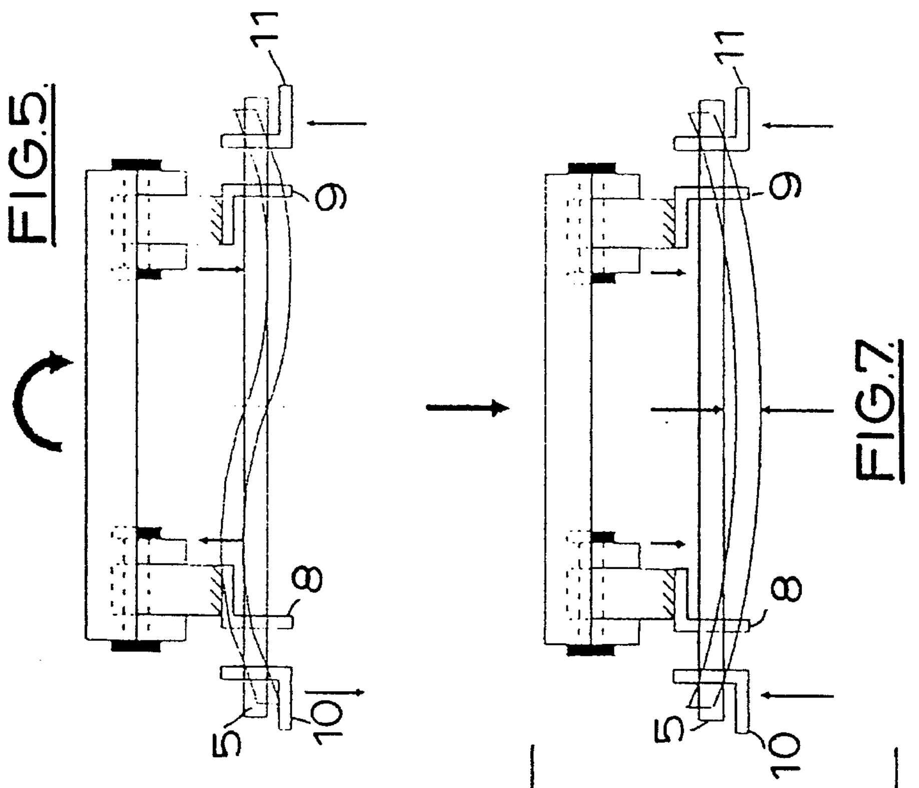
FIG.5
FIG.7
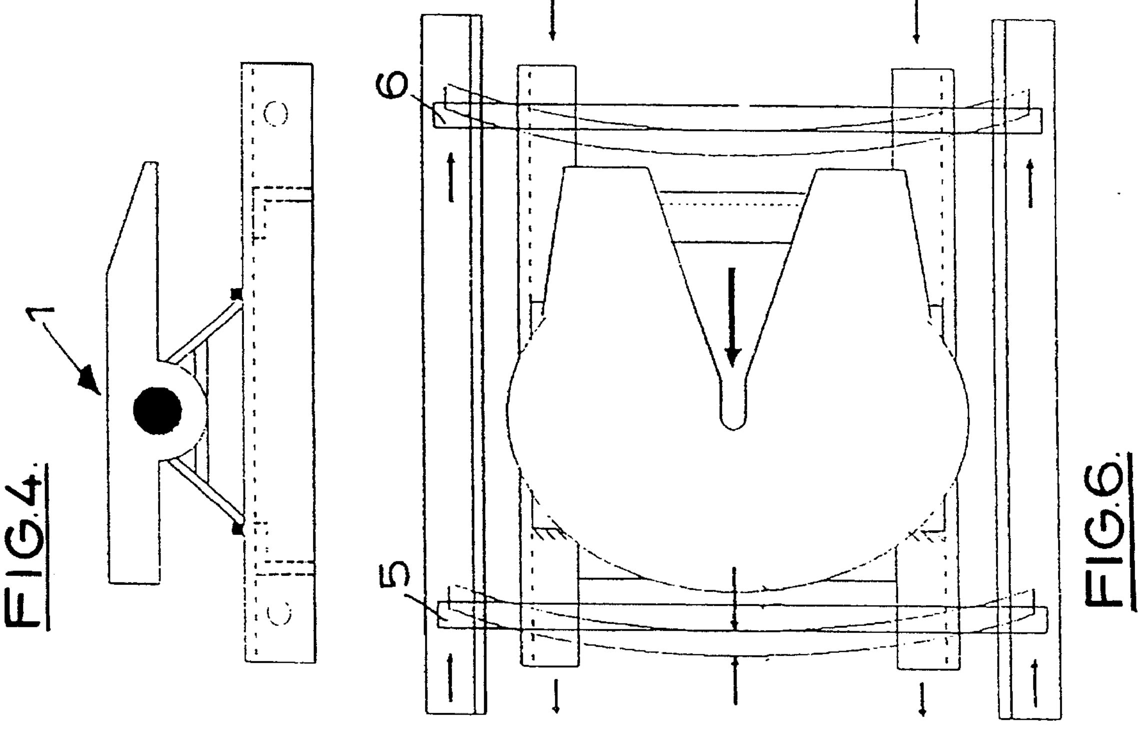
FIG.4
FIG.6

FIFTH WHEEL COUPLING

The invention relates to a vertical and longitudinal force sensor for particular, but not exclusive, use in a fifth wheel hitch.

The tractor vehicle used as the towing unit of an articulated vehicle combination is fitted with a hitch, known as a fifth wheel hitch, to connect it to the trailer it is to haul. Trailers for such vehicles are known as semi-trailers because they possess only one axle system, positioned at the rear. The load on the front part of the semi-trailer is supported by the fifth wheel hitch, from where it is fed into the tractor vehicle structure and thence to the tractor vehicle axles.

It is known to connect trailers and/or semi-trailers together so that more than one may be towed by a single vehicle. In such a case the trailers are connected by fifth wheel hitches or alternatively by dolly bars to which fifth wheel hitches are mounted.

In order for the fifth wheel hitch to operate it is designed to transmit all three components of the tractor/semi-trailer coupling force, comprising those due to vertical load, lateral cornering and longitudinal traction and braking, but to transmit only the roll moment of the corresponding moment set. Pitch and yaw moments are not transmitted across the hitch, thereby permitting the two parts of the vehicle combination to adopt differing pitch and yaw angles, as required for traversing undulating terrain and negotiating corners, respectively.

A sensor operating at the fifth wheel hitch should be capable of measuring the vertical and longitudinal forces between the tractor unit and semi-trailer of an articulated vehicle combination. This must be done without undue influence from other forces and moments present, and without compromising the basic overload capacity and long term durability of the hitch or its mountings.

The physical environment in which a fifth wheel hitch operates is extremely harsh yet, being a 'safety critical' component, it is required to operate under conditions of severe abuse and neglect without sudden failure.

A sensor designed as part of the main plate assembly is not feasible because the loading regime in that case is complex and variable, depending as it does on lubrication, plate flatness, and trailer tolerances amongst other things, and also because different hitch designs would require different sensor designs.

Likewise a sensor in the region of the main plate pivot, either on the plate or the support would be required to be developed in different forms for different hitch designs. It should also be understood that it is not possible to fit a sensor to the pivot pin itself because the pin is not normally stressed. Forces between plate and support are normally transmitted by direct contact of the nose of the support against a lubricated socket machined in the underside of the plate.

A further disadvantage of plate or pivot mounted sensor designs is that two sensors would normally be required, one fitted to each side of the centreline of the vehicle, with the outputs summed. This is necessary because the vertical loads measured by the sensors include the forces required to react to any instantaneous roll moment present between tractor and semi-trailer. These forces are equal in magnitude but opposite in direction, and appear as unwanted and unacceptable noise on the individual sensor signals. Similarly the longitudinal forces measured include those required to react any yaw moment arising from friction at the face of the main plate.

It is therefore considered advantageous in principle to eliminate the unwanted forces caused by each of these moments before measurement by the sensor. In this way a single sensor may be adopted for each force which is not subject to high levels of mechanical noise.

According to a first aspect of the invention a sensor comprises a beam, and means for measuring the vertical and horizontal defections at the center of the beam.

Such means may suitably be displacement transducers, or force transducers. A variable capacitance transducer would be suitable.

Security stops prevent deflection of the beam beyond the working range of the sensor.

According to a second aspect of the invention a fifth wheel hitch assembly is supported by transverse beams, at least one of which is fitted with a sensor according to the first aspect of the invention.

The normal type of structure used for mounting fifth wheel assemblies to tractor chassis, namely general purpose steelwork such as plate, angle or channel, together with welded and mechanical fixings is suitable for modification to fit such a sensing device.

Loads between the fifth wheel assembly and a tractor vehicle are transmitted at four points. A pair of points at the same longitudinal location but on opposite sides of the vehicle, combine to generate the loading environment for the sensor structure. Each beam joining two points is subjected to bending under the influence of the applied and reacted loads, which are offset from one another along the length of the beam.

Further loading points may be used with or without associated beam(s), but the additional ones merely add to the load capacity of the device.

No further significant contact between the hitch and the tractor should exist within the range of the sensor which might 'short circuit' it.

The invention will now be described by way of example only, with reference to and as illustrated in the accompanying drawings, in which:

FIG. 4 shows a side view of a fifth wheel assembly fitted with a sensor according to the invention;

FIG. 5 is a rear view of the assembly of FIG. 4 showing the effect of roll moments on the sensor;

FIG. 6 is a plan view of the assembly of FIG. 4 showing the effect of longitudinal displacement between the tractor chassis and the assembly on the sensor;

FIG. 7 is a rear view similar to that of FIG. 5 but showing the effect of vertical displacement between the assembly and the tractor chassis on the sensor;

Figure 2:
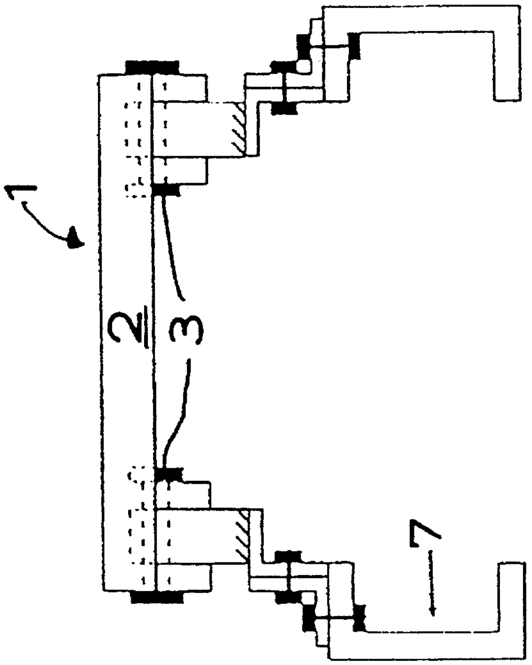
FIG. 2 shows a rear view of a tractor chassis fitted with such an assembly.
Figure 1:
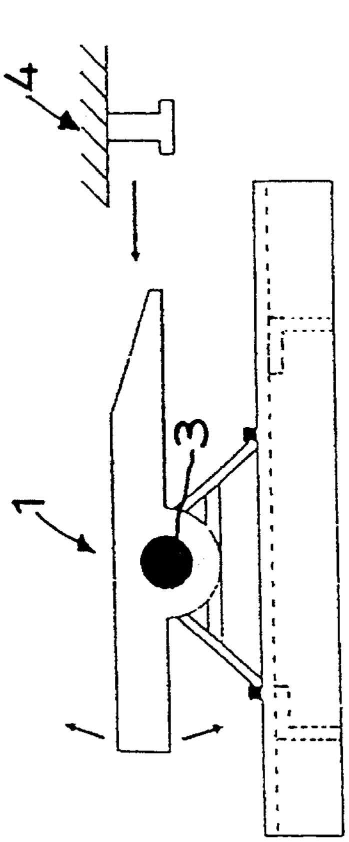
FIG. 1 shows a side view of a known fifth wheel hitch assembly.
Figure 3:
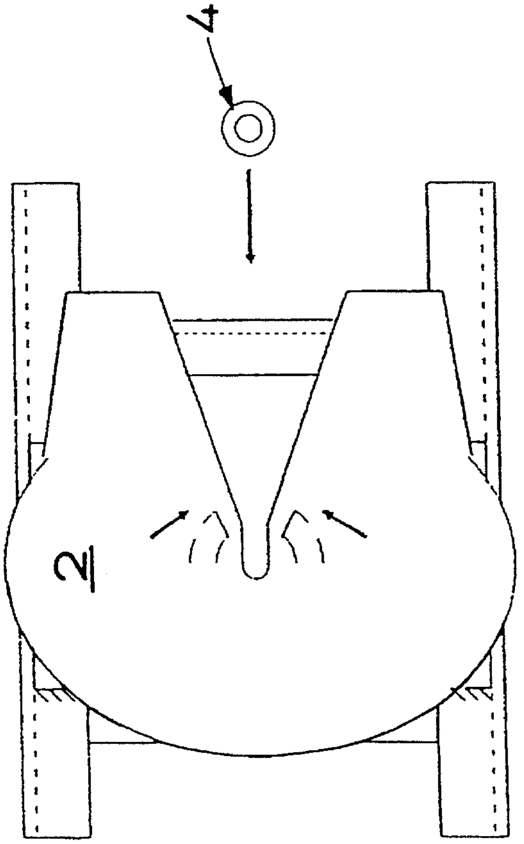
FIG. 3 shows a plan view of such an assembly.
Figure 9:
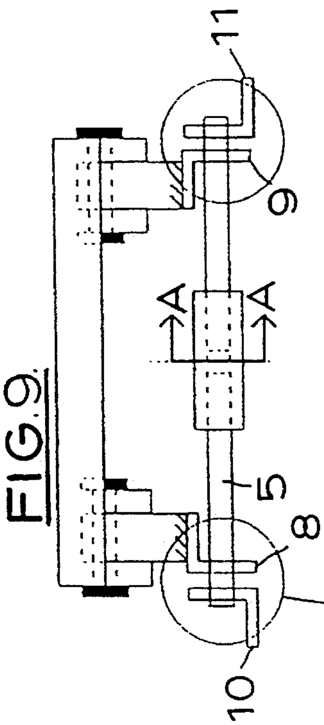
FIG. 9 shows a rear view of the assembly of FIG. 8.

Referring to the drawings, FIGS. 1 to 3 show a typical fifth wheel vehicle hitch assembly 1 having a main plate assembly 2 capable of pivoting about a pivot pin 3 the assembly also being adapted to engage the trailer 4.

FIGS. 4 to 8 show how a sensor according to the present invention works. The fifth wheel vehicle hitch assembly is supported on a pair of beams 5,6.

Figure 10:
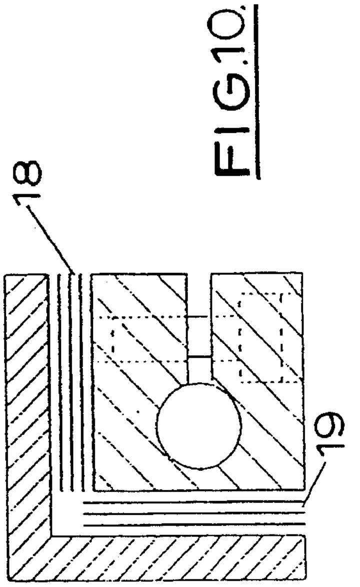
FIG. 10 shows a section along the line A—A of FIG. 9.

The linear deflection of the center of the beam in the vertical and horizontal directions is measured by suitable displacement transducers 18, 19 (FIG. 10) to provide signals related to the vertical and horizontal loads on the hitch. Alternatively, force transducers may be used at the same point. In either case it is important to ensure that the operation of each of the two transducers does not interfere with the other.

Elimination of the effect of the forces caused by roll and yaw moment input is performed automatically by this type of arrangement, because the bar is deflected into an 'S' shape instead of a circular one so that deflection at the center of the beam is zero for these inputs (as shown in FIG. 5).

The structure illustrated is designed to deflect elastically, providing a linear output, throughout the loading range encountered during normal operation. This is adequate for any likely intended use of the sensor. However structural security must be guaranteed over a much wider loading range. For example, in a sensor design for a hitch capable of hauling semi-trailers of up to 30 metric ton gross weight, each of the four load transfer points would be expected to be exposed to forces of around 5 metric tons during normal operation. In order to ensure security during operational extremes, established standards suggest that each load transfer point should not fail under any load up to approximately 30 metric tons. Security stops are incorporated, which are designed to transmit all loads beyond the working range of the sensor, up to the limit demanded by operational security.

Each of the transverse beams 5,6 on which the hitch assemblies are mounted by way of inboard angle section steel profiles 8,9, are themselves supported by outboard angle section steel profiles 10,11. Each of the inboard and outboard angle section profiles are separated by only a small distance.

Identical holes 12 on a common center are drilled and reamed to size, or bored, in the vertical legs of both profiles 8,10;9,11 and shallow counterbores 13 accurately centered on the holes, are machined on the outer faces of both profiles.

Each sensor beam 5,6 is an assembly of three main components, the outer two which are machined from commercial round bar and are identical, and an inner part which serves to connect the two outer parts and actuate the transducers 18, 19. It is not necessary that the whole of the sensor beam deforms in bending and in the embodiment shown only the bar components do to any significant degree.

Commercial disc springs 14 serve to transmit forces within the normal operating range from the fifth wheel assembly 1, via the sensor beam 5,6 to the tractor chassis 7. In order to do this effectively, the springs need to be a snug fit in the counterbores 13, and be appropriately preloaded and firmly clamped by fixing nuts 15 as shown.

The forces to be measured appear as vertical and longitudinal shear forces between the two vertical legs of the steel profiles 8,10;9,11. Under the influence of these forces the profiles move relative to one another, causing the disc springs 14 to deflect conically, the sensor beam 5 to bend and the holes 12 in the profiles to become offset. These deflections are resisted by the disc springs and the sensor bar, both of which are carefully chosen to provide a suitable 'full scale deflection' of the center of the sensor bar assembly under the influence of the maximum normal operating force, without over-stressing either.

Figure 11:
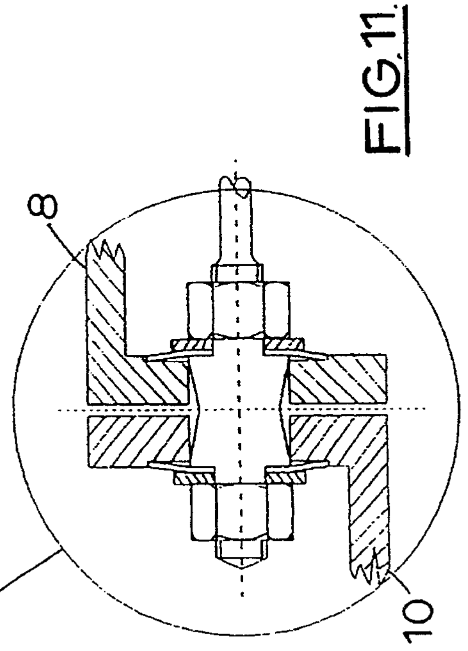
FIG. 11 shows a detail of the assembly of FIG. 9.
Figure 8:
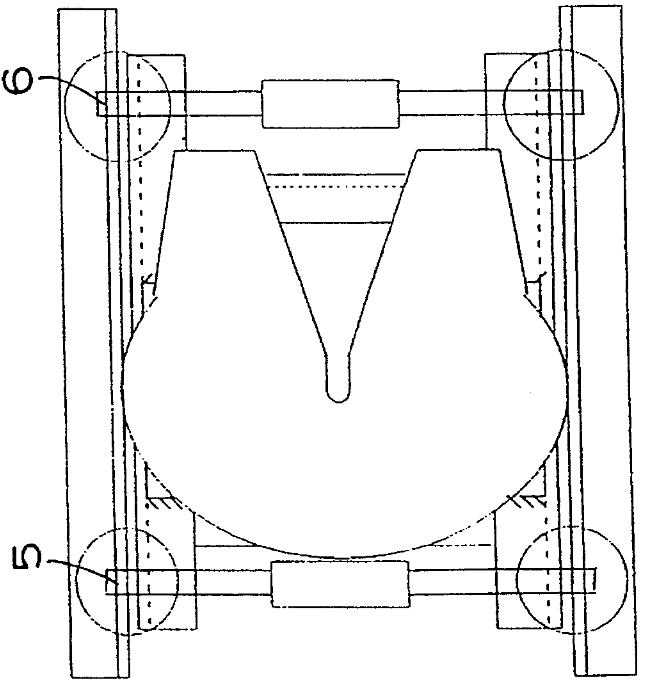
FIG. 8 shows a fifth wheel hitch assembly in which the transverse support beams are fitted with sensors according to the invention.

Transducers placed above and/or below, and in front of and/or behind the center of the bar assembly measure the respective vertical and longitudinal deflections. The transducers shown are variable capacitance devices, but other types may be used. In FIG. 11, the angle profile shown represents the datum for the deflection measurements, and it is fixed rigidly to one of the hitch cross-members. The type of transducer specified can accommodate the attendant deflections perpendicular to the measuring axis without suffering mechanical or electrical problems.

If the main fifth wheel plate pivot does not lie close to the plane containing the two sensor beam assemblies, or if friction in this pivot is high, then transducers are needed for both sensor beams. This is due to the effect on vertical force measurement of longitudinal hitch forces or frictional pitch moment.

Figure 12:
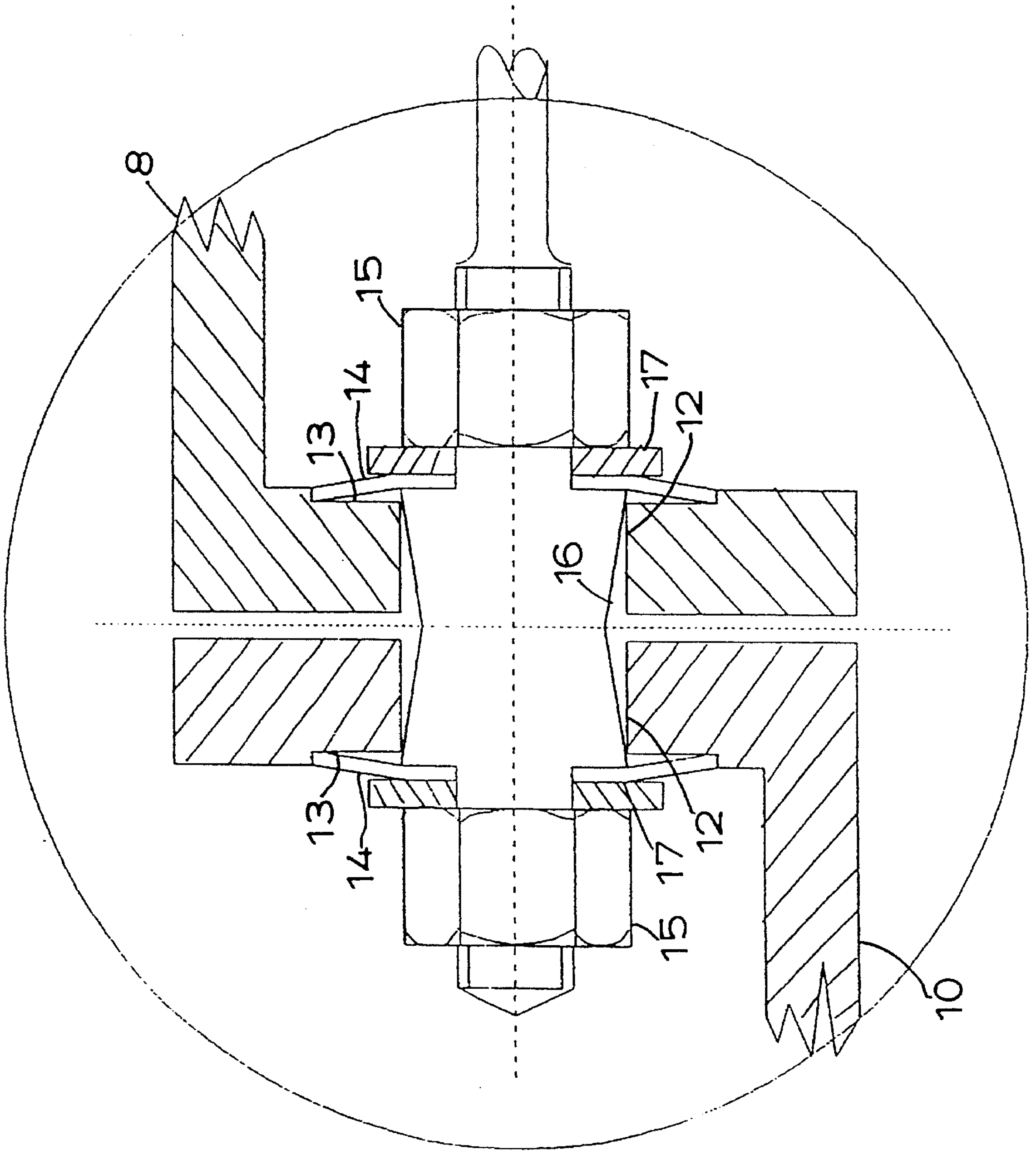
FIG. 12 is an enlarged view of FIG. 11.

Typical deflection of the end of the sensor beam under normal operating conditions is one degree, the security stop preventing further deflection. This is achieved by machining a shallow double taper 16 of one degree in the maximum diameter part of the sensor bar, which has otherwise a diameter equal to that of the holes through which it passes. When the bar has one degree conical deflection no more is possible. Further force input simply applies a direct shear force to the sensor bar at the root of the double taper. FIGS. 11 and 12 show an exaggerated taper.

The shear section of the bar, as well as the steel profiles which apply the shear, are designed to be capable of supporting the overload condition without failure. Additional security stops, possibly comprising a similar double taper design but in the form of a loosely fitted bobbin, without disc springs or sensor beam, may be used if required.

It is only during overload that the double taper and holes support significant load. Up to that point the disc springs 14 transmit the forces, ensuring that the entire sensor structure is elastically suspended. Such a floating design eliminates any sliding contact which would corrupt the performance of the sensor due to its attendant unpredictable friction, wear and corrosion.

Lateral force, from the cornering of the vehicle, appears normal to the plane of the vertical legs of the steel profiles, and is transmitted up to a certain value by additional axial deformation of the disc springs 14, until those on one side of the vehicle become flat. These springs will deflect no further and become solid, further force is transmitted via the abutment washers 17 under the nuts 15, the nuts themselves, and the double taper section in tension.

Alternatively, these higher forces may be transmitted by contact between the mutually adjacent faces of the steel profiles on the opposite side of the vehicle. This may be permitted if the mating surfaces are fitted with a suitable low-wear, low-friction interlayer, and if such contact is infrequent.

We claim:

1. A fifth wheel hitch assembly in which said fifth wheel hitch assembly is supported by transverse beams being susceptible to horizontal and vertical deflections, at least one of said transverse beams comprising a sensor having a transducer for measuring said horizontal deflection at the center of said beam and a transducer for measuring said vertical deflection at the center of said beam, said beam comprising two outer parts and an inner part connecting said outer parts, said transducers being placed on said inner part, said inner part serving to actuate said transducers.

2. An assembly according to claim 1, in which said outer parts of said transverse beam are supported by inboard angle section profiles.

3. An assembly according to claim 2, in which said inboard angle section profiles are themselves supported for a chassis by outboard section profiles.

4. An assembly according to claim 3, in which said outer parts of said transverse beam pass through identical holes on a common center running through said inboard and outboard section profiles.

5. An assembly according to claim 4, in which said profiles are provided with counterbores on their outer faces.

6. An assembly according to claim 5, in which a disc spring fits in each of said counterbores.

7. An assembly according to claim 6, in which said disc springs and the stiffness of said bar contribute to the stiffness of said sensor.

8. A sensor comprising a beam susceptible to horizontal and vertical deflections; a transducer for measuring said horizontal deflection at the center of said beam; and a transducer for measuring said vertical deflection at the center of said beam; said beam comprising two outer parts and an inner part connecting said outer parts, said transducers being placed on said inner part, said inner part serving to actuate said transducers.

9. A sensor according to claim 8, in which said transducers comprise displacement transducers.

10. A sensor according to claim 9, in which said transducers comprise variable capacitance transducers.

11. A sensor according to claim 9, in which a security stop prevents deflection of said beam beyond the working range of said transducers.

12. A sensor according to claim 11, in which said security stop comprises a shallow double taper in an outer end of at least one of said outer parts.

13. A sensor according to claim 8, in which said transducers comprise force transducers.

14. A sensor according to claim 13, in which said transducers comprise variable capacitance transducers.

15. A sensor according to claim 13, in which said inner part comprises a bar assembly.

16. A sensor according to claim 15, in which said horizontal deflection transducer is horizontally aligned with the center of said bar assembly and said vertical deflection transducer is vertically aligned with the center of said bar assembly so as to measure the respective vertical and horizontal deflections.

17. A sensor according to claim 16, in which a security stop prevents deflection said beam beyond the working range of said transducers.

18. A sensor according to claim 13, in which a security stop prevents deflection of said beam beyond the working range of said transducers.

19. A sensor according to claim 8, in which a security stop prevents deflection said beam beyond the working range of said transducers.

20. A sensor according to claim 8, in which at least one end of said beam is provided with a disc spring, said disc spring providing a stiffness contribution and a security stop contribution to said sensor.

* * * * *